June 10, 1941.    H. F. COURTRIGHT ET AL    2,245,430
CONTAINER
Original Filed July 28, 1932
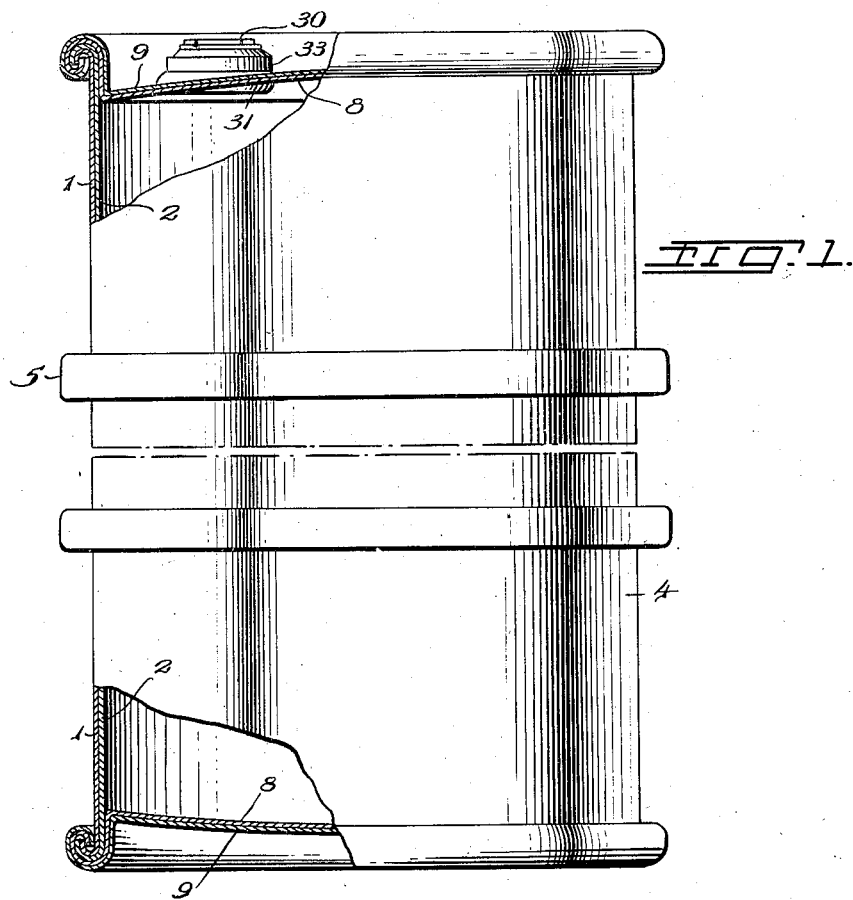
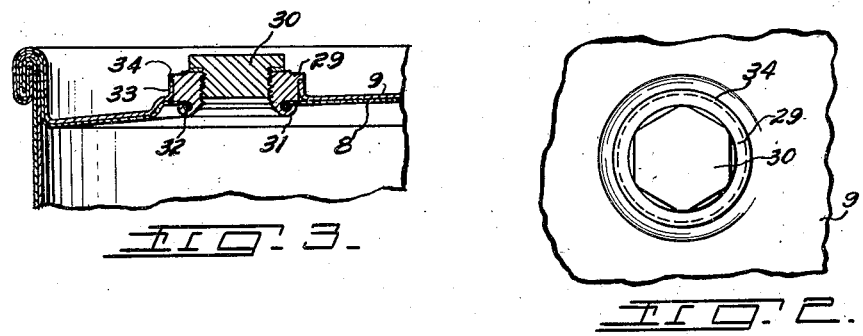
Inventors
Harry F. Courtright and
Charles S. Stiles
By Geo. B. Pitts
Attorney Patented June 10, 1941

2,245,430

UNITED STATES PATENT OFFICE 2,245,430

CONTAINER

Harry F. Courtright, Centerburg, and Charles S. Stiles, Cleveland Heights, Ohio, assignors to The Cleveland Steel Barrel Company, Cleveland, Ohio, a corporation of Ohio Original application July 28, 1932, Serial No. 625,360, now Patent No. 2,078,530, dated April 27, 1937. Divided and this application August 13, 1936, Serial No. 95,938

4 Claims. (Cl. 285—49)

This invention relates to a container construction, more particularly a double metallic walled container in which the inner and outer walls are inter-related to provide a substantially unitary construction and liquid tightness, while permitting expansion and contraction of the walls independently of each other, and in which the outer wall is protected against contact with the contents of the container. The invention also relates to the mounting of one or more bung rings in one or more portions of the container in such manner that the contents of the container cannot contact with its outer wall. By reason of the fact that the walls may be made of different thicknesses of sheet stock and also formed of different materials, the outer wall may be made of relatively thick or heavy sheet metal (such as sheet steel) and capable of withstanding strains due to dropping of the container when filed and internal and external pressures, and the inner wall may be made of a different material that is relatively thin and/or soft, depending on the contents to be shipped or stored in the container. For these reasons the container may be constructed with an inner wall which will not be affected by or affect the contents of the container. The container may therefore be used for storing and shipping various kinds of liquids, including food products, essential oils, acids, beverages and milk.

This application is a division of our application filed July 28, 1932, Serial No. 625,360, now Letters Patent No. 2,078,530, dated April 27, 1937.

One object of the invention is to provide an improved container that is lined with a suitable material to permit shipment and storing of various kinds of liquids and semi-liquids without danger of such liquids or semi-liquids being contaminated or the liner being affected thereby.

Another object of the invention is to provide an improved bung ring and mounting therefor for a double walled container so arranged that danger of the contents of the container contacting with the outer wall and/or escaping is avoided.

Other objects of the invention will be apparent to those skilled in the art to which our invention relates from the following description taken in connection with the accompanying drawing, wherein Fig. 1 is a side elevation, parts being broken away, of a container embodying our invention.

Fig. 2 is a fragmentary plan view showing the bung ring and closure.

Fig. 3 is a fragmentary section through the walls of the container, bung ring and its mounting and closure.

In carrying out the process of making the container, we first form or shape sections of sheet metal of the desired width and length into bodies 1, 2, preferably of cylindrical shape, the former body, as shown in Fig. 1, serving as the outer wall or member of the container, indicated as an entirety at 4 and the latter body serving as the inner wall or member of the container 4. The walls 1, 2, are rolled or bent into shape in any desired manner and provided at their opposite ends with circumferential flanges, whereas their longitudinal side edges may be welded or seamed. The interior diameter of the body 1 and exterior diameter of the body 2 are preferably such that the latter, when assembled within the former, will be substantially in face to face or surface to surface relation with the body 1, and thus serve as a liner. The body 1 is formed from sheet steel of any desired gage. The body 2 may be formed of any desired sheet material and of any desired gage, but due to the fact that the outer wall is relatively heavy, the inner wall may be made of thinner sheet stock material, and as the purpose of the lining for the container is to provide for the shipment and storing of liquids and semi-liquids which would cause corrosion of sheet steel and/or be contaminated thereby, such inner wall is preferably formed of a material (for example, copper, chromium nickel, aluminum, or other alloys) that will not corrode or in any way affect the liquids or semi-liquids, chemically or otherwise, to be shipped or stored.

5 indicates hoops which may be rolled into the wall 1 while it is being shaped, or thereafter, but in the illustrated form of construction the hoops 5 consist of steel rings secured to the wall 1, as shown in Fig. 1.

Next, we stamp out and shape the inner and outer walls or members 8, 9, respectively which, when assembled face to face and connected to the bodies 1, 2, constitute the heads 10 of the container 4. The walls 8, 9, are formed from sheet material similar to the bodies 2, 1, respectively, and each shaped to provide marginal portions or flanges arranged to be related to the flanges on the bodies 1, 2. Each wall 8, 9, has a contour similar to the cross-sectional shape of the walls 1, 2. The stamping and shaping of the walls 8 and 9 are effected in any well known manner.

We next assemble one wall 8 and one wall 9 to form one head and one wall 8 and one wall 9 to form the other head, and we then form in one pair of the head members 8, 9, aligned openings for each bung ring to be mounted therein.

The openings in those walls 8, 9, which will carry the bung rings and the distention of the metal around these openings, either or both, may, when desired, be provided for simultaneously with the stamping and shaping thereof or after the two walls have been assembled. It will be understood that either or both of the openings for the container may be formed in the walls 1, 2, and suitable rings mounted in such openings.

We next connect heads 10 to the opposite ends of the bodies 1, 2, the marginal portions of the walls 8, 9, forming each head 10 and adjacent flanges on the bodies 1, 2, being rolled into a unitary double seam relation, as shown in Fig. 1, the result being that all of the walls are interlocked into a single liquid tight joint, with the inner walls 2, 8, in contact at the joint, so that the contents cannot contact with the outer walls.

29 indicates a bung ring threaded internally to receive a plug 30 and formed of material similar to that used for the walls 2 and 8. The lower face of the ring is provided with a bendable flange 31 which is bent and compressed over the marginal portion of the wall 8, such portion being folded on itself at 32 to form a wall which interlocks with the flange 31 when the latter is folded laterally and toward the ring 29. The marginal portion of the wall 9 is distended as shown at 33 and welded to the side wall of the ring. By preference, the side wall of the ring 29 is cut away to form a shoulder 34 which engages the end edge of the opening formed in the wall 9. When the ring 29 is formed with the shoulder 34, a weld is preferably effected between it and the portion 33.

The plugs, as well as the rings or parts thereof which contact with the container contents, used for closing the bung rings are also formed of material similar to that used for the walls 2 and 8 to eliminate corrosion of these parts or contamination of the contents.

From the foregoing description it will be seen that we provide a double walled or lined container having the usual equipment, namely two bung openings; also that the inner walls 2 and 8 are co-extensive with the walls 1 and 9, respectively and that the walls 2 and 8 are so related and connected to the walls 1 and 9 that the contents placed in the container can only contact with the inner walls.

Our construction is advantageous in that the walls for the body portion and for the respective heads may be assembled as separate units and thereafter the body portion and each head or both heads may be doubled seamed by a single operation. This operation may be carried out for the reason that the related flanges of each unit are held in fixed relation and may therefore be folded into a double seam relation. The construction is also advantageous for the reason that the inner and outer walls may be positioned face to face and fabricated while in such relation, so that no unequal stresses on the inner walls result.

To those skilled in the art to which our invention relates, many changes in construction and widely differing embodiments and applications of the invention will suggest themselves without departing from the spirit and scope of the invention. Our disclosures and the description herein are purely illustrative and not intended to be in any sense limiting.

What we claim is:

1. A container having a portion formed of inner and outer sheet metal walls, said walls being formed with alined openings, the marginal edge of the opening in the outer wall being distended to provide an up-standing collar surrounding the opening in the inner wall, in combination with an internally threaded annulus formed of non-corrosive material for supporting a plug, fitting within said collar in engagement with the inner wall, the inner side of said annulus being provided with a flange extending through the opening in the inner wall and having interlocked engagement with the marginal edge portion thereof and said collar being welded to the outer side wall of said annulus.

2. A container having a portion formed of inner and outer sheet metal walls, said walls being formed with aligned openings, the marginal edge portion of the opening in the inner wall being folded on itself to form a bead and the marginal edge portion of the opening in the outer wall being distended, and an internally threaded bung ring formed of non-corrosive material and provided with a flange on its lower side bent laterally over the said bead and the distended portion of the outer wall being welded to the side wall of said ring.

3. A container having a portion formed of inner and outer sheet metal walls, said walls being formed with aligned openings, the marginal edge portion of the opening in the inner wall being folded on itself to form a bead and the marginal edge portion of the opening in the outer wall being distended, and an internally threaded bung ring formed of non-corrosive material and provided with a flange on its lower side bent laterally over the said bead and the distended portion of the outer wall being welded to the side wall of said ring, said ring having a lateral wall engaging the end edge of the distended portion of said outer wall.

4. A container comprising a body member and head members, each said member comprising an inner wall formed of non-corrosive sheet metal and an outer wall formed of sheet metal, said walls being disposed in substantially face to face relation, the opposite end portions of the walls for said body member having outwardly extending superposed face to face related flanges and the walls for each head member having peripheral face to face related flanges, the flange of the inner wall of each head member being engaged with the adjacent flange of the inner wall of said body member and the flanges of each head member and the adjacent flanges of the body member being folded together into a unitary double seam, the walls of one of said members being formed with registering openings, the marginal edge of the opening in the inner wall being folded on itself to form a circumferential bead and the marginal edge of the outer wall being distended to form an up-standing collar surrounding the opening in said inner wall, and a bung ring formed of non-corrosive metal mounted in said collar in engagement with said inner wall and provided on its inner side with a flange extending through the opening in said inner wall and bent laterally into engagement with said bead, said collar being welded to the side wall of said ring.

HARRY F. COURTRIGHT.
CHARLES S. STILES.